Oct. 10, 1944.  D. C. HEITSHU  2,360,056
BATTERY MOUNTING
Filed Dec. 5, 1941  2 Sheets-Sheet 1

Inventor
Daniel C. Heitshu,
By Emerson B. Connell
Attorney

Oct. 10, 1944.  D. C. HEITSHU  2,360,056
BATTERY MOUNTING
Filed Dec. 5, 1941  2 Sheets-Sheet 2
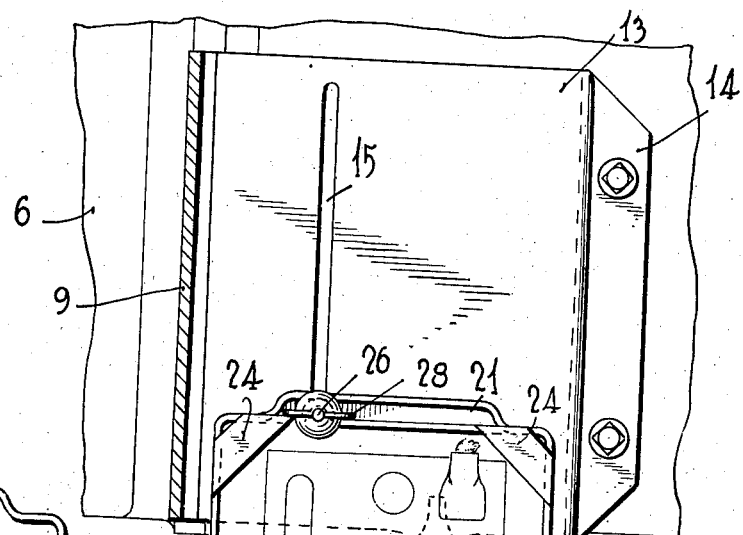
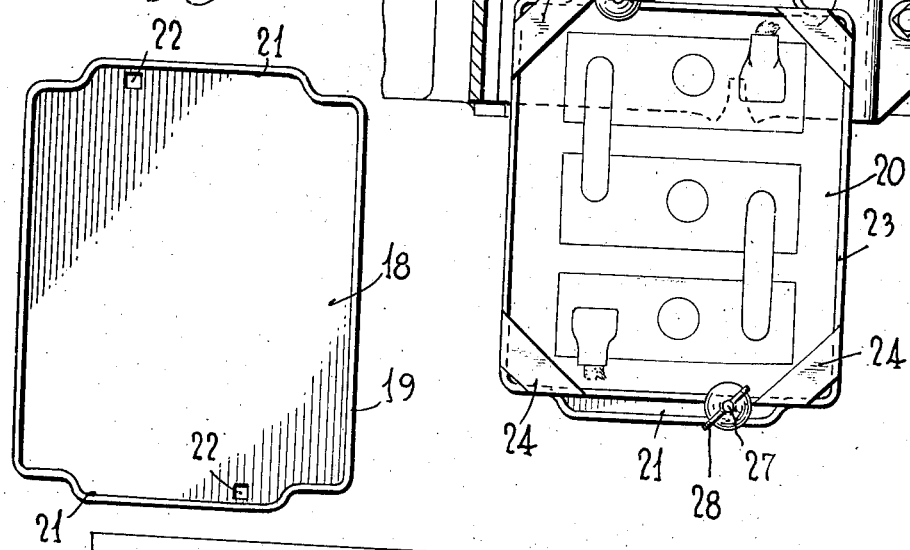
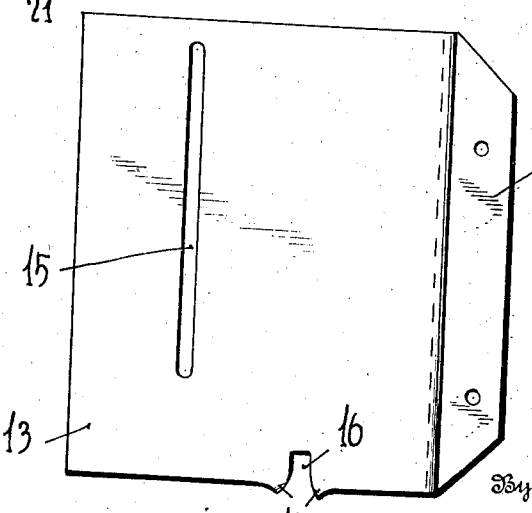
Daniel C. Heitshu, Inventor
By Emerson B. Llowell
Attorney Patented Oct. 10, 1944

2,360,056

UNITED STATES PATENT OFFICE 2,360,056

BATTERY MOUNTING

Daniel C. Heitshu, Detroit, Mich., assignor to J. I. Case Company, Racine, Wis., a corporation Application December 5, 1941, Serial No. 421,795

14 Claims. (Cl. 180—68.5)

The following detailed specification describes my improvement in a storage battery mounting for tractors and the like. The design of tractors is relatively simple offering little space in which to hold or support a storage battery. With the development of tractors to include added electrically operated facilities necessitating the use of a storage battery, it has become a problem how to mount the storage battery.

It is an object of my invention to provide a storage battery mounting utilizing available space in tractors of the present day design without exposing the storage battery unnecessarily.

It is a further object of my invention to so mount the storage battery that it may be firmly located in position without danger of dislodgment and at the same time will be protected from the heat of the engine or unnecessary exposure to the weather.

It is an additional object of my invention to so arrange the mounting for the storage battery that the latter may be shifted temporarily into a position where it can be readily inspected and serviced without, however, disconnecting it from the associated tractor circuits.

Among the object of my invention is the utilization of the customary tractor parts for support and shelter of the battery and its mounting.

My invention also includes novel features of construction and arrangement of parts incidental to the purposes above outlined.

As an example of the manner in which my invention may be embodied, I have shown the preferred form of the invention by way of example in the accompanying drawings in which Fig. 1 is a side elevation partly in section showing the novel battery mounting and the associated tractor parts;

Fig. 3 is a similar plan view showing the battery mounting extended into the position for servicing the battery;

Fig. 4 is a plan view of the supporting pan, and

Fig. 5 is a plan view of the novel shelf.

Figure 1:
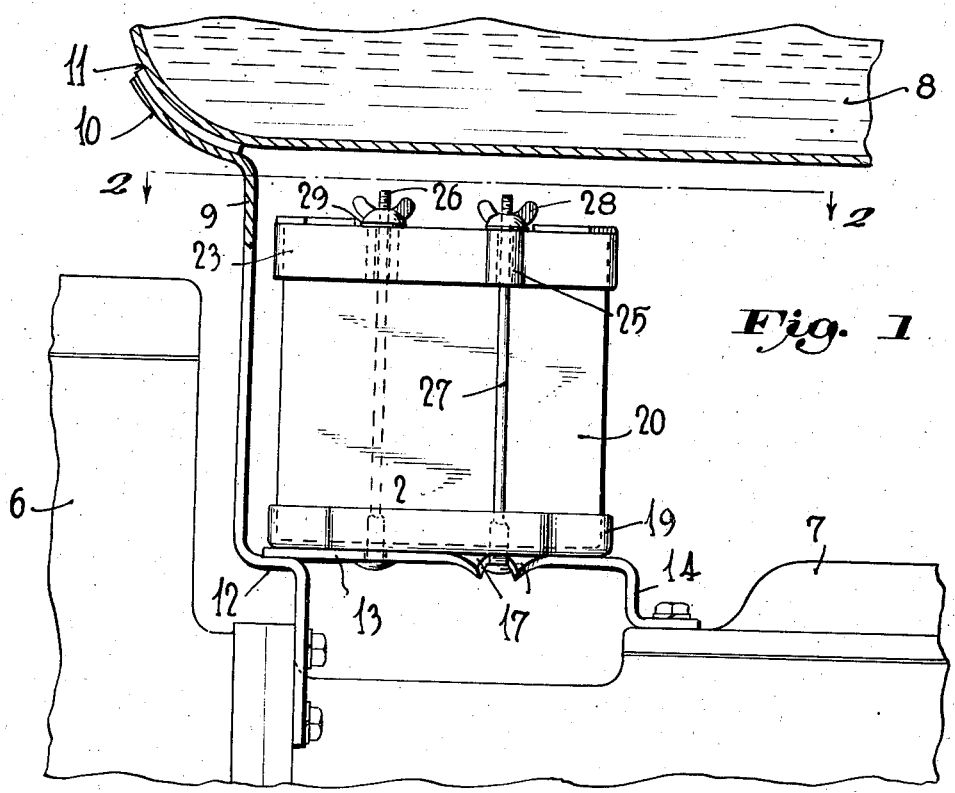

Generally speaking the invention deals with proving a storage battery mounting supported upon parts of the conventional tractor such as the engine block and the transmission case, with provision for protecting the battery from the heat of the engine and from the weather by using the fuel tank as a cover. Incidental to such arrangement and to facilitate inspection and service of the battery the mounting provides holding and supporting means for the battery case such that the latter may be loosened from the support proper and shifted into an exposed position where it is held firmly while being inspected and serviced.

In the drawings I have represented the engine block of an internal combustion engine 6, a transmission case 7 and a fuel tank 8. A partition 9 has its bottom bolted to the vertical wall of the transmission case where the latter is attached to the engine block. The upper end 10 of the partition rests against the forward curved wall of the fuel tank 8 and may be attached either permanently by welding or alternatively held against the wall of the tank by means of an insulating gasket 11 or the like.

Spaced slightly above the transmission case 7 the partition has a horizontally extending ledge 12. The partition extends transversely of the tractor as far as desired and forms protection for the battery case from the heat of the engine and exposure to the weather from the front.

A shelf 13 also of sheet metal has its forward end resting upon the step 12. The opposite end 14 of the shelf is extended downwardly and laterally to form a step which rests upon the transmission case and is bolted in position. It is not necessary to attach the front end of the shelf to the ledge 12 but on the contrary a shelf at this point may be capable of slight sliding motion to compensate for distortion of the frame.

As illustrated more particularly in Figure 5 the shelf 13 has a slot 15 extending transversely or parallel to the forward end of the shelf. This slot ends at a point relatively remote from one side of the shelf in order to form proper leverage in supporting the pan and battery in the service position. This side of the shelf is notched as shown at 16 for a suitable distance inwardly with parallel walls. This notch is flared and the resulting corners of the side of the shelf are bent down to form ears 17, 17.

A pan or tray 18 is slidably mounted upon a shelf 13 and has an upstanding peripheral rim 19 proportioned to fit around a battery case 20. Each side of the pan 18 is extended to form extensions 21, 21 shown in Fig. 4. Holes 22 square or otherwise non-circular or irregular in shape are provided at diametrical points in the extensions 21, 21. One hole 22 registers with slot 15 while the second hole registers with the notch 16 of the shelf.

A hold-down collar 23 of sheet metal or other material is formed to fit around the upper edge of the battery case and to overlie the peripheral flange 19 of the pan 18. Angular corner straps 24 overlie the corners of the battery case as shown in Figs. 2 and 3.

Figure 2:
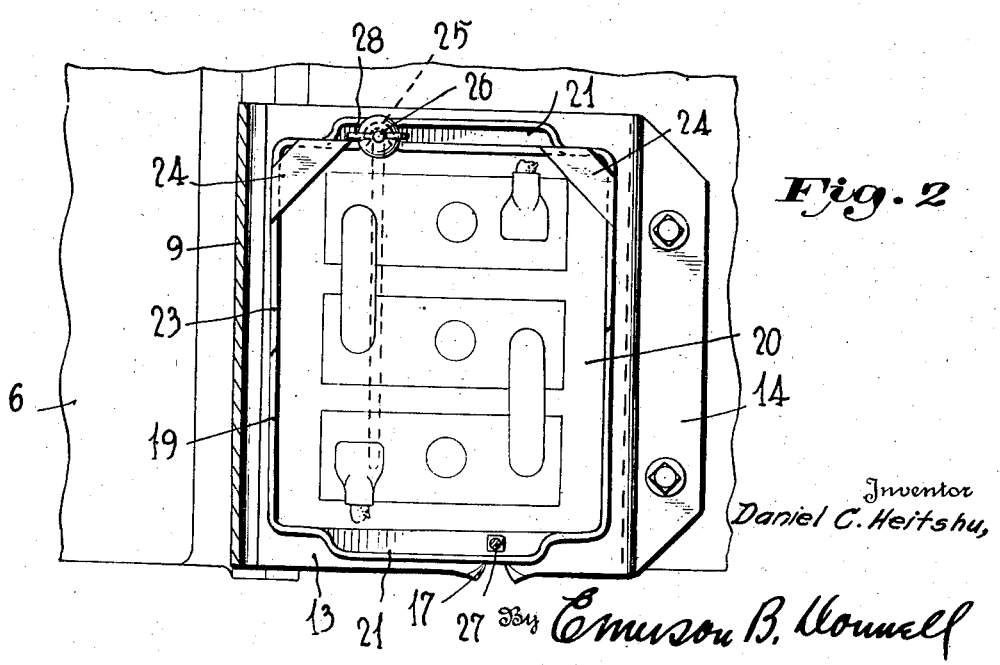
Fig. 2 is a plan view partly in section taken on the line 2—2 of Fig. 1.

The sides of the collar 23 fit closely over the ends of the battery case as shown in Figs. 2 and 3. The sides of the collar are each bent outwardly to form bights or loops 25. One loop overlies each hole 22 of the pan 18. Two clamping bolts 26 and 27 are provided. Each bolt has a square shank of an appropriate size to fit in the slot 15, the notch 16 and the holes 22. At their upper ends the bolts are screw-threaded as shown in Fig. 1 and receive wing nuts 28 by which the washers 29 are clamped tightly against the loops 25 of the collar 23.

The battery is mounted by being placed upon the pan 18 and the latter supported on the shelf 13. Bolt 26 is passed upwardly through slot 15, hole 22 in the pan and finally through the bight or loop 25 of the hold-down collar. The washer 29 and clamping wing nut or other form of nut is then threaded tightly on bolt 26.

Bolt 27 is then passed upwardly through pan 18 and its upper end screw-threadingly clamped to the front loop 25 as shown in Fig. 1. It is noted, however, that in this assembly or service position bolt 27 does not fit behind the ears 17, 17 of the shelf but on the contrary the head of the bolt rests at the bottom of the pan 18. In this position the bolt serves merely to clamp the battery case 20 between the pan 18 and the hold-down collar 23.

The slot 15 ends sufficiently back of the side edge of the shelf 13 that the pan with the battery case upon it is supported in cantilever position beyond the shelf. It is to be understood that the cables forming the battery connections are sufficiently long to reach the battery terminals in this position.

When in this position it is possible to clean the battery, test it or to provide such service as is necessary for example, replenishing the water in the electrolyte.

The battery and its mounting are placed in operating position by loosening both bolts 26 and 27 slightly and sliding pan 18 transversely across the shelf 13. As this is done the head of the bolt 27 is carried under the ears 17, 17 and the irregular or non-circular shank is held in notch 16 against rotation. When the wing nuts have been tightened the battery case 20 is clamped tightly between the hold-down collar 23 and the pan 18. At the same time the bolts firmly fasten the pan to the shelf 13 and the ears 17, 17 form a detent for the head of the bolt 27.

In the operative position the storage battery is thus mounted beneath the fuel tank without the need for any more clearance than will be demanded for tightening the wing nuts 28. The battery will be protected in front both from the heat of the engine and the driving force of the weather. The fuel tank of course forms adequate shelter from above.

Any inspection or servicing required for the battery is readily accomplished by first loosening the wing nuts and sliding the pan 18 with the battery case upon it transversely into the cantilever position with the bolt 26 lodged in the near end of the slot 15.

While I have shown my invention in its preferred embodiment, the scope of the invention is of course not so limited but on the contrary many changes in arrangement, form, shape and structural details are contemplated within the scope of the invention as defined in the following claims.

What I claim is:

1. A mounting for a storage battery or the like, comprising a shelf with a transverse slot, a pan having an extension on one side, a hold-down collar between which latter and the pan a battery is held, and clamping means extending through the slot in the shelf, the extension of the pan and the collar.

2. A mounting for a storage battery, comprising a shelf with a transverse slot, a pan having an extension on one side and a peripheral rim, a hold-down collar between which and the pan a battery is held, and clamping means extending through the slot in the shelf, the extension of the pan and the collar.

3. A mounting for a storage battery, comprising a shelf with a transverse slot and a notch along one side edge, a pan having two openings registering respectively with said slot and said notch, a hold-down collar between which and the pan a battery is held, a clamping bolt extending from the collar through an opening in the pan and through the slot, and a second clamping bolt extending from the collar through the other opening in the pan and through the notch of the shelf.

4. A mounting for a storage battery, comprising a shelf with a transverse slot and a notch along one side edge, a pan having an extension on each opposite side and an opening in each extension registering with said slot and notch respectively, a hold-down collar between which and the pan a battery is held, a clamping bolt extending from the collar through an opening in the pan and through the slot, and a second clamping bolt extending from the collar through the other opening in the pan and through the notch of the shelf.

5. A mounting for a storage battery, comprising a shelf with a transverse slot and a notch along one side edge, a pan having an extension on each opposite side and an opening in each extension registering with said slot and notch respectively, a peripheral rim for the pan, a hold-down collar between which and the pan a battery is held, a clamping bolt extending from the collar through an opening in the pan and through the slot, and a second clamping bolt extending from the collar through the other opening in the pan and through the notch of the shelf.

6. A mounting for a storage battery comprising a shelf with a transverse slot and a notch along one side edge, the corners of the edge adjacent said notch being down-turned to form ears, a pan having an extension on each opposite side and an opening in each extension registering with said slot and notch respectively, a hold-down collar between which and the pan a battery is adapted to be held, a clamping bolt extending from the collar through an opening in the pan and through the slot, and a second clamping bolt extending from the collar through the other opening in the pan and through the notch back of the ears.

7. In combination with a tractor power plant having an internal combustion engine, a transmission case in the rear thereof and a fuel tank spaced above and between the engine and case, of a stepped transverse partition extending vertically behind the engine, a shelf supported on said partition and on the said transmission case, a pan on the shelf, adapted to hold a storage battery, a hold-down collar, and means clamping the collar and pan to the shelf, said shelf being provided with apertures to allow transverse movement of said pan.

8. In combination with a tractor power plant having an internal combustion engine, a transmission case in the rear thereof and a fuel tank spaced above and between the engine and case, means mounted on the transmission case for supporting a storage battery beneath the fuel tank and shielding means in front of the battery mounting.

9. A mounting for a storage battery comprising a slotted shelf, having a notch at one edge, the corners of the edge adjacent said notch being downturned to form ears, a pan, a hold-down collar between which and the pan a battery is adapted to be held, a clamping bolt extending from the collar through the slot and engaged with the pan, and a second clamping bolt extending from the collar through the notch back of the ears and engaged with the pan, said collar, battery and pan being slidable on the shelf to the extent permitted by the slot when the second mentioned clamping bolt is disengaged from the ears.

10. A mounting for a storage battery, or the like, for supporting said battery in a confined space, said mounting comprising a shelf in said space having an elongated slot, a pan for holding the storage battery, a hold-down collar for holding the battery in the pan, and a bolt passing through the collar, pan and slot for holding said battery and pan on said shelf, slidably to the extent of said slot, out of said confined space for servicing when said bolt is loosened.

11. A mounting for a storage battery or the like for supporting said battery in a confined space, said mounting comprising a shelf in said space having an elongated slot, a pan for holding the storage battery and a hold-down collar between which and said pan said battery is held, and clamping means extending through the slot in the shelf, the pan and the collar for holding the battery fixedly on the shelf when tightened, and for holding it slidably on said shelf to the extent permitted by said slot when said clamping means is loosened for temporarily supporting said battery in a position projecting from said confined space for servicing.

12. A mounting for a storage battery or the like, for supporting said battery in a confined space, said mounting comprising a shelf in said space having an elongated slot, a pan for holding the storage battery and clamping means for holding the battery in the pan, said clamping means extending through the slot in the shelf and through the pan for holding the battery fixedly on the shelf when tightened, and for holding it slidably on said shelf to the extent permitted by said slot when said clamping means is loosened for temporarily supporting said battery in a position projecting from said confined space for servicing.

13. A mounting for a storage battery or the like, for supporting said battery in a confined space, said mounting comprising a shelf in said space having an elongated slot, said shelf having a notch at one edge, a pan for holding the storage battery and clamping means engaging the battery for holding it in said pan, said clamping means having a portion extending through the slot in the shelf and through the pan, and another portion extending through the pan and said notch for holding said battery and said pan fixedly on the shelf when tightened, the second mentioned portion of said clamping means being disengageable from said notch and the first mentioned portion being movable in said slot for holding said battery and pan slidably on said shelf to the extent permitted by said slot when said clamping means is loosened for temporarily supporting said battery in a position projecting from said confined space for servicing.

14. A mounting for a storage battery or the like, for supporting said battery in a confined space, said mounting comprising a shelf in said space having an elongated slot, said shelf having a notch at one edge, the corners of the edge adjacent said notch being downturned to form ears, a pan for holding the storage battery and clamping means engaging the battery for holding it in said pan, said clamping means having a portion extending through the slot in the shelf and through the pan, and another portion extending through the pan and said notch back of said ears, for holding said battery and said pan fixedly on the shelf when tightened, the second mentioned portion of said clamping means being disengageable from said notch and said ears and the first mentioned portion being movable in said slot for holding said battery and pan slidably on said shelf to the extent permitted by said slot when said clamping means is loosened for temporarily supporting said battery in a position projecting from said confined space for servicing.

DANIEL C. HEITSHU.